United States Patent [19]

Larson et al.

[11] Patent Number: 4,923,370

[45] Date of Patent: May 8, 1990

[54] RADIAL TURBINE WHEEL

[75] Inventors: C. Allan Larson, Tempe; Montgomerie C. Steele, Phoenix, both of Ariz.

[73] Assignee: Allied-Signal Inc., Phoenix, Ariz.

[21] Appl. No.: 277,086

[22] Filed: Nov. 28, 1988

[51] Int. Cl.$^5$ .............................................. F01D 5/08
[52] U.S. Cl. ..................................... 416/95; 415/115; 416/185
[58] Field of Search ................. 416/95, 182, 181, 183, 416/185, 188; 415/117, 176, 186, 187, 115, 175

[56] References Cited

U.S. PATENT DOCUMENTS

| | | | |
|---|---|---|---|
| 2,822,974 | 2/1958 | Mueller | 415/186 X |
| 2,873,945 | 2/1959 | Kuhn . | |
| 2,919,103 | 12/1959 | Schelp | 415/117 |
| 2,941,780 | 6/1960 | Nuell et al. | 416/182 |
| 2,977,088 | 3/1961 | Buchi | 415/186 |
| 2,998,958 | 9/1961 | Alford . | |
| 3,232,580 | 2/1966 | Birmann | 415/117 |
| 3,310,940 | 3/1967 | Oetliker | 416/95 |
| 3,535,873 | 10/1970 | Szydlowski | 60/39.66 |
| 3,635,586 | 1/1972 | Kent et al. | 416/97 |
| 3,883,263 | 5/1975 | Mai | 415/116 |
| 4,275,990 | 6/1981 | Langley et al. | 416/95 |
| 4,306,834 | 12/1981 | Lee | 415/116 |
| 4,460,313 | 7/1984 | Austrem | 415/178 |

FOREIGN PATENT DOCUMENTS

| | | | |
|---|---|---|---|
| 1122205 | 9/1956 | France | 416/181 |
| 519770 | 3/1955 | Italy | 415/176 |
| 633917 | 2/1962 | Italy | 415/186 |
| 83603 | 5/1982 | Japan | 416/95 |
| 571658 | 9/1945 | United Kingdom | 415/186 |

Primary Examiner—Everette A. Powell, Jr.
Attorney, Agent, or Firm—R. Steven Linne; James W. McFarland

[57] ABSTRACT

Apparatus and method for extending the thermal fatigue life and/or improving the performance of radial-flow turbine wheels in gas turbine engines by providing a thickened reinforcing pad on the wheel backface and cooling air passages in the surrounding case structure to direct high velocity cooling air onto the pad.

13 Claims, 3 Drawing Sheets

RADIAL TURBINE WHEEL

TECHNICAL FIELD

This invention relates generally to gas turbine engines and more specifically to an apparatus and method to extend the life and/or improve the performance of radial flow turbine wheels in such engines.

BACKGROUND OF THE INVENTION

As is well known, a gas turbine engine in its basic form includes a compressor section, a combustion section and a turbine section arranged to provide a generally axially extending flow path for the working gases. Compressed air, from the compressor section, is mixed with fuel and burned in the combustor to add energy to the gases. The hot, pressurized combustion gases are expanded through the turbine section to produce useful work and/or thrust. While an aircraft propulsion engine delivers most of its useful power as thrust, other types of gas turbine engines, typically called auxiliary power units, furnish no thrust but are used to supply compressed air and mechanical power to drive electrical generators or hydraulic pumps. The power produced by any engine is a function of, among other parameters, the temperature of the gases admitted into the turbine section. That is, all other things being equal, an increase in power from a given engine can be obtained by increasing the gas temperature. However, as a practical matter, the maximum gas temperature, and hence the efficiency and output of the engine, is limited by the high temperature capabilities of the various turbine section components.

Within the turbine section are one or more stages of turbine wheel assemblies which are rotated by direct exposure to the hot gases. Such wheels are subjected to very high centrifugal forces and severe thermal gradients as well as high temperatures. There are two basic designs or types of turbine wheels, each having certain operating advantages and disadvantages. An axial-flow wheel has many short, straight blades extending radially from a generally flat disk. Typically the blades are cast individually and attached to a forged disk of different material so that the properties of each component may be optimized for its particular environment. The other basic type of turbine wheel, a radial-inflow wheel, presents more challenging design problems when used in a severe operating environment. Radial-flow wheels are generally one piece with several thin, scrolled blades or fins arranged in a frusto-conical shape somewhat like a common radial centrifugal compressor rotor. In operation, hot combustion gases are directed at the relatively thin blades near the peripheral rim of the wheel and flow inwardly along the hub. The hub surface (and rim) is rapidly heated by the hot gas whereas the interior of the hub responds slowly during a cold engine start. Thus, a transient thermal gardient is created within the hub which causes extreme circumferential compression at the hub surface. When the engine is unloaded or shutdown, the hot gas temperature rapidly drops to a lower level. This reverses the thermal gradient by rapidly cooling the hub surface and rim, thus producing circumferential tension which adds to the tensile stresses produced by centrifugal forces. Such subjection of the rim to high temperature compression and subsequent rapid cooling contraction creates structural cracks, thought to be due to low-cycle thermal fatigue, which leads to eventual destruction of the entire turbine wheel.

Several different approaches to solving or reducing this cracking problem have been tried by prior researchers in this field.

One early attempt involved the addition of cooling air passageways within the turbine wheel adjacent the hot front face. See, for example, U.S. Pat. No. 2,873,945. However, such internal passageways are difficult and/or costly to manufacture.

Another early patent, U.S. Pat. No. 2,919,103, attempts to reduce the temperature of the thin peripheral rim by moving the rim slightly out of the hot gas flow path and directing cooling air towards it.

One of the most successful attempts to reduce the rim cracking problems is shown, but not described, in U.S. Pat. No. 3,163,003. It was discovered that the life of radial-flow turbine wheels could be improved significantly, with only a small loss of aerodynamic efficiency, by removing the thinnest material between the blades or fins near the rim. Such scalloped wheels have now become common in the art. However, the cracking problems were not eliminated and still occur (but after longer times) in the saddle regions between the blades.

More recent attempts to even further extend the life of the scalloped wheels involve the use of two different materials so that the saddle region is crack resistant while the blade tips are resistant to high temperature creep. See, for example, U.S. Pat. Nos. 4,581,300 and 4,659,288. Such dual alloy wheels are difficult and expensive to manufacture. It should be apparent that there is still a need for improvements in radial flow turbine wheels.

Thus it is an object of the present invention to provide a method and apparatus for reducing the range of thermal variation in the saddle region of scalloped radial-flow turbine wheels due to successive cycles of high temperature operation and cool down so that the successive compression and contraction stresses are reduced and thereby extend the life of such wheels.

Another object of the invention is to provide a novel combination of turbine wheel geometry which cooperates with cooling air passages in the surrounding turbine shroud structure so that the thermal fatigue life in the wheel may be increased.

A further object of the invention is to provide a surrounding shroud structure which directs and regulates the flow of cooling air to the more critical portions of the turbine wheel.

Further objects and features of the invention will be apparent from the following specification and claims.

SUMMARY OF THE INVENTION

The present invention aims to overcome the disadvantages of the prior art as well as offer certain other advantages by providing a novel combination of features in a radial flow turbine wheel and its surrounding structure, which features cooperate to extend the useful life and/or increase the performance of such wheels.

A conventional wheel having a deeply scalloped rim is modified by adding an annular reinforcing pad, of increased axial thickness, along the outermost portion of the backface adjacent the saddle area of the wheel. This additional mass slows the thermal response rate of this critical area due to changes in operating conditions such as startup, load changes, and shutdowns. By slowing the thermal response rate, the difference in temperature between the thin rim and the thick hub, and thus thermal stress, is reduced.

In addition, to further lower the thermal gradient, cooling air is directed onto and outwardly along this pad and then axially past a flow discourager, which not only prevents a backflow of hot gases into the cavity behind the wheel but also injects the cooling air parallel to and along the front face of the wheel to provide film cooling of the critical saddle region.

This combination of modifications to the wheel shape and the cooling air flow path cooperate to reduce the thermal stresses in the wheel. Therefore, for any given operating conditions, the low-cycle fatigue life of the turbine wheel may be extended or for any given design life, the wheel may be operated at higher inlet gas temperatures and/or higher rotational speeds. Alternatively, the wheel may be redesigned to improve aerodynamic efficiency by increasing the radius of the saddle (i.e. shallower scallops) without reducing fatigue life or operating conditions.

BRIEF DESCRIPTION OF THE DRAWINGS

While this specification concludes with claims particularly pointing out and distinctly claiming the subject matter which is regarded as the invention, it is believed that the invention may be better understood from the following detailed description of a presently preferred embodiment when taken in connection with the accompanying drawings in which:

BEST MODE FOR CARRYING OUT THE INVENTION

Figure 1:
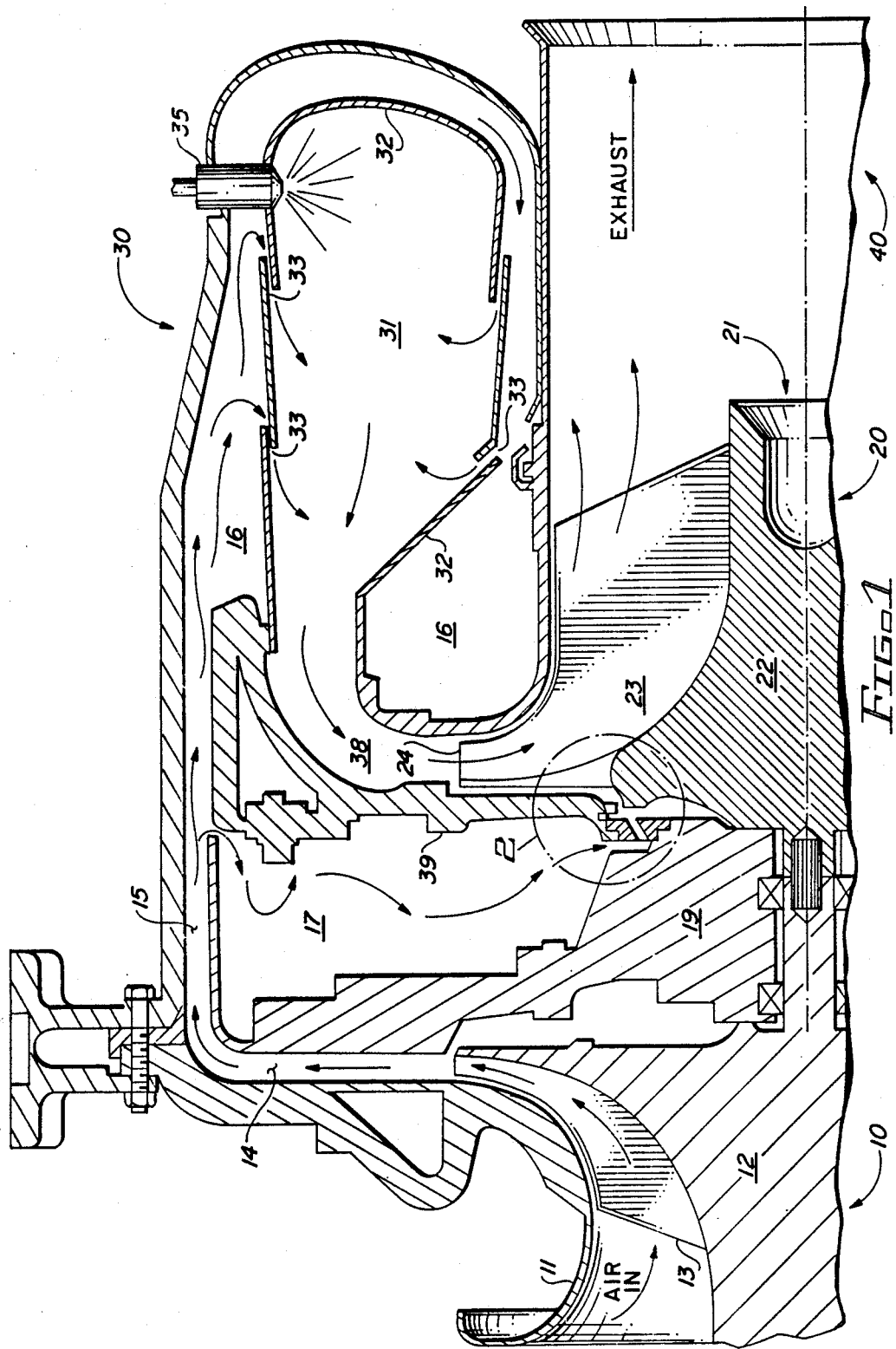
FIG. 1 is an illustration, in partial cross-section of a gas turbine incorporating the present invention.

FIG. 1 illustrates, in partial cross-section, a very simplified gas turbine engine of the type having only a single stage compressor section (10) driven by one turbine section (20) which incorporates features of the present invention.

The engine's compressor section (10) includes an annular air intake shroud (11) surrounding a radial outflow centrifugal compressor impeller (12) which has a plurality of curved blades (13) extending therefrom in a generally conical shape for moving air into the engine. Compressed air from the compressor impeller (12) flows through a diffuser (14) to a high pressure air supply passage (15) and splits into two streams. Most of the air flows into the combustion section (30) of the engine to be burned while a smaller portion flows into an internal bleed air chamber (17) for cooling and other uses to be described later.

The combustor section (30) includes an annular combustion chamber (31) where the compressed air is mixed with fuel and burned. Fuel is supplied into the chamber (31) through injectors or spray nozzles (35) connected to a suitable fuel control system (not shown). Air from the high pressure air supply passage (15) flows into the area (16) surrounding the combustion chamber (31) and through slots (33) and/or holes in the chamber wall (32). This arrangement helps cool the chamber wall (32) while providing good mixing of the air and fuel. Hot combustion gases flow out of the combustion chamber (31) through an exit nozzle (38) which directs the high velocity gases into the power turbine section (20) of the engine.

The turbine section (20) includes a deeply scalloped, radial inflow turbine wheel (21) having a plurality of thin, curved blades (23) extending from a generally conical central hub portion (22) as will be explained in more detail later. Hot gases from the combustion section (30) impinge on the inducer tips (24) of the blades (23) and flow down the wheel between the blades causing the wheel (21) to rotate. The gases leave the wheel in a generally axial direction and exit the engine through the exhaust outlet (40). The power produced by the rotating turbine wheel (21) is used not only to drive the compressor rotor (12) but also powers other accessories (not shown) such as electrical generators and hydraulic pumps. Also not shown are several engine control or support systems, all well known in the art, required for automatic operation such as a starting system, lubrication system, etc.

Figure 2:
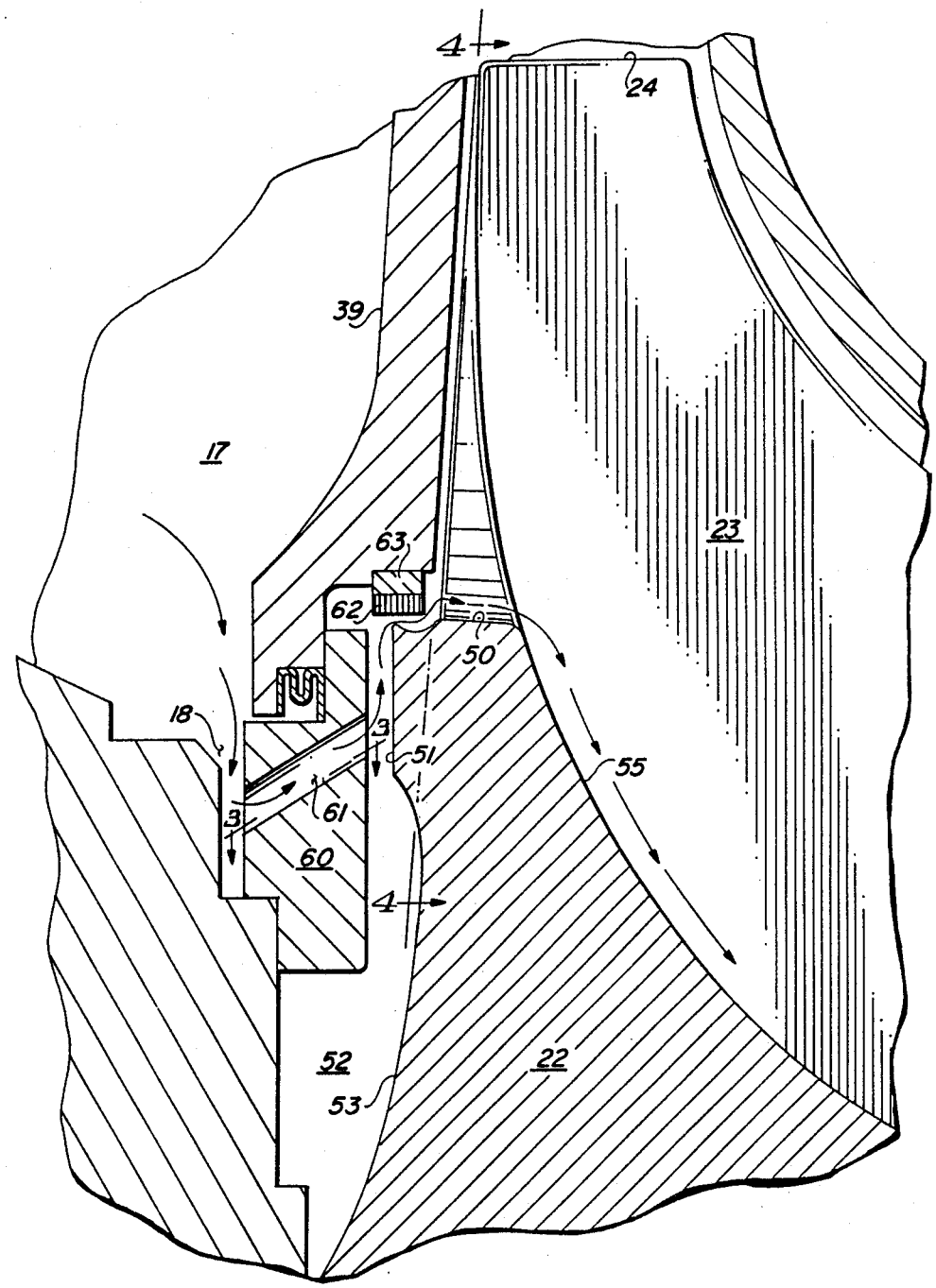
FIG. 2 is an enlarged view of the improved turbine wheel saddle region of FIG. 1.

One support system which is important to the present invention is the bleed air cooling system. As mentioned previously, high pressure air from the supply passage (15) splits into two streams with one stream flowing into an internal bleed air chamber (17) where it is available for cooling various of the internal parts of the engine and for other purposes well known in the art. The present invention uses a small portion of the air from chamber (17) to cool and protect the turbine wheel (21) as illustrated in FIG. 2.

Figure 3:
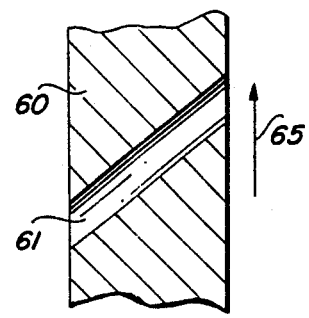
FIG. 3 is a fragmentary view along the lines 3—3 of FIG. 2 showing the orientation of cooling passages.

Cooling air is supplied, by any convenient route, to a channel (18) behind a plate (60) adjacent the backface (53) of the turbine wheel hub (22). Plate (60) cooperates with other parts of the engine casing (19) and surrounding housing (39) and the backface (53) of the turbine wheel (21) to define a backface cavity (52). It is well known in the art that it is desirable to flow of cooling air through this backface cavity (52) in order to purge the backface cavity (52) of hot gases and help prevent overheating of the turbine wheel (21). However, it is also known that excessive use of air for cooling lowers engine efficiency. The present invention provides far more effective use of the same or even smaller amounts of cooling air by flowing the air at high speed (preferably sonic velocity) through small passage (61) drilled through plate (60), at an angle radially outwardly and, preferably, circumferentially inclined in the direction of rotation (65) of the wheel as shown in FIG. 3. The air impinges onto modified turbine wheel (21), described in detail below, then flows outwardly to and past a seal (63) mounted between the casing (39) and the rotating turbine wheel (21). Seal (63) preferably includes a rub tolerant or abradable material (62) portion adjacent the wheel so that a small (about 0.5 to 1.0 mm) clearance gap can be maintained. The seal (63) acts as both a flow discourager, to prevent the flow of hot combustion gases into the backface cavity (52), and also as a flow director, to force the cooling air to change direction and flow axially along the saddle surface (50) of the turbine wheel between the blades (23).

Figure 4:
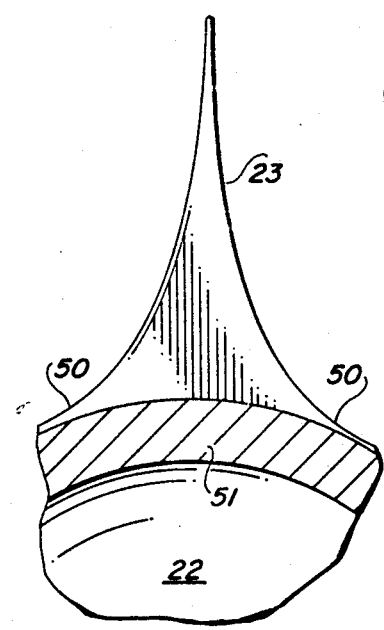
FIG. 4 is a fragmentary view along the lines 4—4 of FIG. 2 showing the rear force of the turbine wheel.

The turbine wheel (21) has been modified to cooperate with, and synergistically enhance the effects of, the foregoing cooling scheme. The most important modification, shown best in FIG. 4, is the addition of an annular, integral reinforcing pad (51) on the rear face (53) of the wheel hub (22) just inwardly of the backface scallops and adjacent the wheel saddle surface areas (50). Previously, turbine wheels have typically been designed as thin as practicable in this region in order to reduce the portion of the wheel mass at large radii and thereby minimize centrifugal (tensile) stresses in the wheel hub (22). The present invention offsets the increase in centrifugal stress by a greater reduction in thermal stress so that the combined total stress during a cold engine start is reduced both at the saddle surface (compressive) and at the center of the hub interior (tensile), thereby improving the overall life of the modified turbine wheel. The thermal stresses are reduced by both reducing the cyclic thermal response of the wheel near the saddle area, due to the increased mass of the pad, and by reducing the maximum temperature levels, due to the impingement of cooling air onto the pad (51). In addition, after the cooling air flows across the saddle surface (50), it continues flowing down the front surface (55) of the hub between the blades (23) to provide a film cooling effect which further protects the hub (22) from the hot combustion gases.

It should be apparent that the combination of the improved cooling system and the modified turbine wheel may be utilized either to extend the useful wheel life in a turbine engine operating at previous temperatures and speeds or to increase the performance of an engine without the sacrifice in wheel life normally associated with increased temperatures and/or speeds.

In one test of the present invention, this latter approach was utilized to increase the power output of a turbine without compromising the low-cycle fatigue life of the wheel.

Figure 5:
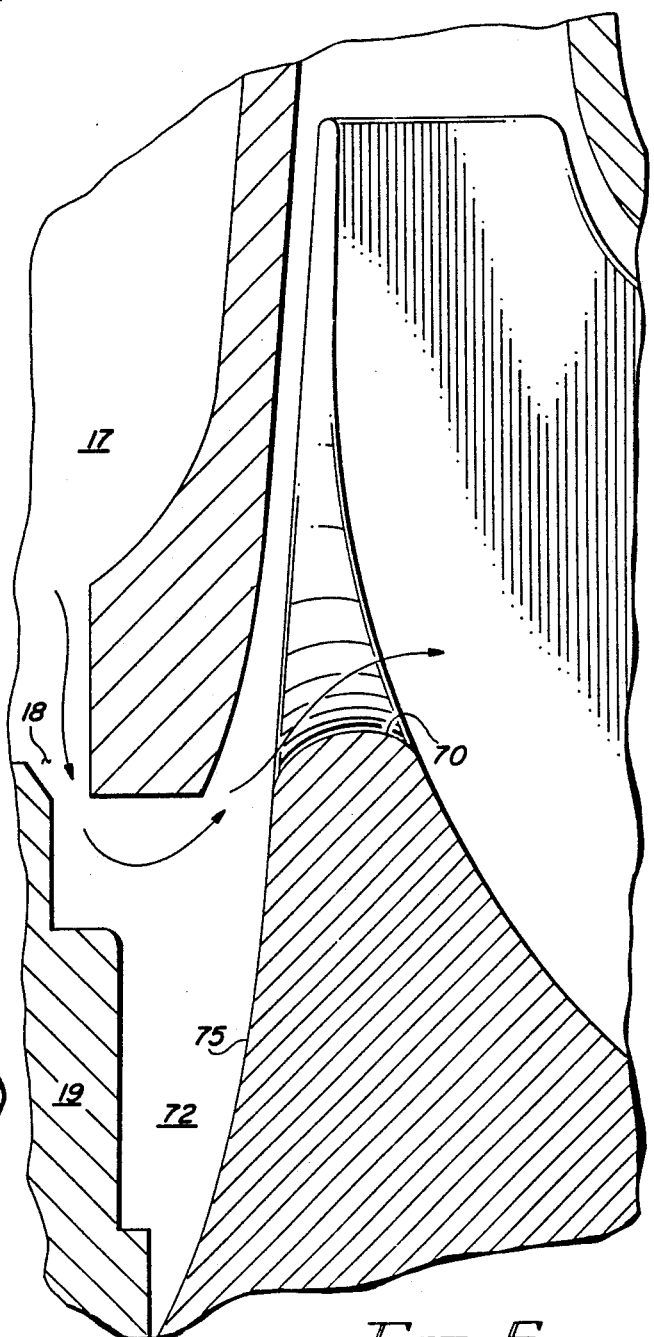
FIG. 5 is an enlarged view of a prior art turbine wheel saddle region.

The prior configuration of a turbine engine which was used to develop the present invention is illustrated in FIG. 5. Its useful life was limited by thermal cracking of the wheel saddle surface (70) as discussed previously. It employed a conventional, deeply scalloped turbine wheel (75) and about the same amount of cooling airflow to purge the backface cavity (72) but the airflow was not directed onto the wheel for impingement or film cooling. Although this prior turbine used a slightly smaller (by about 5%) and slower (about 2.5%) wheel it operated at a higher maximum gas temperature (about 10%) so that an approximate comparison in performance can be made to illustrate some of the advantages of the present invention.

The improved turbine, shown in FIGS. 1 and 2, included an integral pad (51) on the turbine wheel (21) which extended radially inward from the saddle (50) about 15 to 20% of the distance to the wheel centerline. The axial length of the pad (51) was selected to increase the mass (by about 50 to 100%) of metal in the hub saddle region of the wheel and to provide the proper geometry for the impingement cooling feature. The overall size of the pad (51) is limited by the maximum allowed local stress increase in the backface (53) caused by increased centrifugal forces.

The pad (51) had an outwardly extending rim or edge which cooperated with a stationary seal (62) mounted in the housing radially outwardly from the pad so that cooling air was directed axially through the gap between the edge and seal and then across the top rim of the pad towards the saddle areas (50).

Even though the improved turbine produces about 14% more power than the prior model, the wheel saddle is expected to last 21% longer before fatigue cracking and the hub interior to have a 23% improved life. Furthermore, it should be apparent that if the improved turbine were derated to the lower power level of the prior model, the wheel life increase would be even greater.

While in order to comply with the statutes, this invention has been described in terms more or less specific to one preferred embodiment, it is expected that various alterations, modifications, or permutations thereof will be readily apparent to those skilled in this art. Therefore, it should be understood that the invention is not to be limited to the specific features shown or described, but it is intended that all equivalents be embraced within the spirit and scope of the invention as defined by the appended claims.

What is claimed is:

1. A method of increasing the useful life of a radial flow turbine wheel, of the type having a plurality of thin, scrolled blades arranged in a generally frusto-conical shape extending outwardly from a hub and including a front face with a relatively small diameter, a back face with a relatively large diameter terminating in a peripheral rim having saddle areas formed between adjacent blades, and rotatable within a surrounding housing about its longitudinal axis by the hot gases of a turbine engine, comprising the steps of:

providing said wheel with an integral, annular reinforcing pad extending radially inwardly about 20% of the distance from the saddle areas toward the axis of rotation and extending axially rearwardly from said backface to provide an increased axial thickness of the backface adjacent the saddle areas of the wheel;

impinging generally axially flowing jets of cooling air onto said pad near its radially innermost portion;

flowing said cooling air along the surface of said pad in a generally outwardly radial direction;

subsequently directing the flow of cooling air onto and axially along the saddle areas, while discouraging the flow of hot gases to the backface of the wheel, and flowing the air toward the front face along the hub surfaces for film cooling thereof, in order to reduce thermally induced cracking in the saddle areas of the wheel.

2. The method of claim 1 wherein the step of impinging cooling air onto said pad includes the steps of flowing high velocity jets of air at said pad through orifices in said housing which are circumferentially inclined in the direction of rotation of said wheel.

3. The method of claim 2 wherein the step of flowing high velocity air includes flowing air at sonic velocity through said orifices.

4. The method of claim 1 wherein the step of directing the flow of cooling air onto and axially along the saddle areas includes the steps of forming a small clearance gap between said annular pad and a portion of said surrounding housing by fitting said housing with a rub tolerant seal member and providing said annular pad with a radially outwardly extending edge portion and maintaining said gap at less than about one millimeter to direct said flow therebetween.

5. Improved turbine engine apparatus of the type including housing and case structures adapted to surround and support a rotatable turbine wheel along with ancilliary engine equipment, where the improvement comprises:

at least one radial inflow turbine wheel mounted for rotation about an axis within said housing, said wheel having a plurality of scrolled blades arranged in a generally frusto-conical shape extending outwardly from a hub and including a front face with a relatively small diameter, a backface with a relatively large diameter terminating in a peripheral rim having saddle areas formed between adjacent blades, and an annular reinforcing pad of increased axial thickness extending rearwardly from the backface adjacent the saddle areas of the wheel:

cooling air passages within the surrounding housing opening toward the innermost portion of said annular pad; and flow discourager means interposed between said annular pad and said surrounding housing for preventing the flow of hot combustion gases towards the backface of said wheel and for directing cooling air from said air passages to and along said saddle areas.

6. The apparatus of claim 5 wherein said annular reinforcing pad is an increase in the axial thickness of the wheel over a radial distance extending up to about 20% inwardly from said saddle areas towards the rotational axis of the wheel.

7. The apparatus of claim 6 wherein said increase in axial thickness of the wheel is sufficient to increase the mass of material in the wheel saddle areas by from about 50% to 100%.

8. The apparatus of claim 5 wherein said cooling air passages are inclined radially outwardly and in the direction of rotation of said wheel.

9. The apparatus of claim 8 wherein said cooling air passages are sized to create sonic velocity airflow therethrough.

10. The apparatus of claim 1 wherein said flow discourager means includes a seal member of rub tolerant material attached to said surrounding housing.

11. The apparatus of claim 10 wherein said flow discourager means includes a small clearance gap between the radially outermost portion of said annular pad and said seal member.

12. The apparatus of claim 11 wherein said clearance gap is between about one half to one millimeter wide.

13. An improved radial inflow turbine wheel having a plurality of scrolled blades arranged in a generally frusto-conical shape extending outwardly from a hub a backface with a relatively large diameter terminating in a peripheral rim having saddle areas formed between adjacent blades, and an annular reinforcing pad along the backface of the wheel extending radially inwardly and axially rearwardly from immediately adjacent the saddle areas sufficiently to provide a mass of material in the pad about 50% to 100% of the mass of material in the adjacent portion of the wheel hub which extends axially forwardly from said backface.

* * * * *